C. L. HAWES.
SELF LUBRICATING BEARING.
APPLICATION FILED NOV. 23, 1918.

1,334,535.

Patented Mar. 23, 1920.

INVENTOR
Charlie L. Hawes.
By Day, Oberlin & Day
ATTORNEYS.

UNITED STATES PATENT OFFICE.

CHARLIE L. HAWES, OF ASHTABULA, OHIO.

SELF-LUBRICATING BEARING.

1,334,535.   Specification of Letters Patent.   Patented Mar. 23, 1920.

Application filed November 23, 1918. Serial No. 263,836.

*To all whom it may concern:*

Be it known that I, CHARLIE L. HAWES, a citizen of the United States, and a resident of Ashtabula, county of Ashtabula, State of Ohio, have invented a new and useful Improvement in Self-Lubricating Bearings, of which the following is a specification, the principle of the invention being herein explained and the best mode in which I have contemplated applying that principle, so as to distinguish it from other inventions.

The present improvements relate more specifically to the provision of means for automatically lubricating roller or ball bearings, in contradistinction to ordinary journal boxes. To the accomplishment of this end I have combined a special form of lubricant elevating member with a device on the shaft whereby the lubricant thus elevated is caused to flow into the bearing where it is needed. More exactly, the invention consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 1:
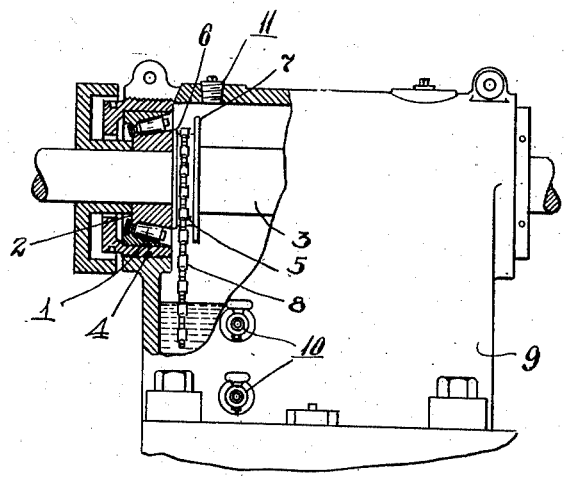
Figure 2:
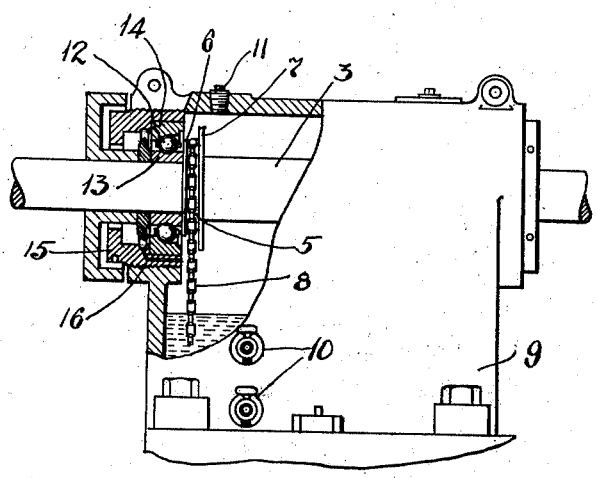

Figure 1 is a part section and part side elevation of my improved self-lubricating bearing, the bearing proper, which is of the roller type, being thus sectioned; Fig. 2 is a similar view illustrating the adaptation of my invention to a ball bearing, in contradistinction to a roller bearing; and Fig. 3 is a view similar to Figs. 1 and 2, showing a modification of the construction.

In the construction illustrated in Fig. 1, a roller bearing of familiar type is illustrated, consisting of a series of rollers 1 interposed between an inner ring 2 fixed on the shaft 3 and an outer ring 4 similarly fixedly held in the housing or journal box. Adjacent the larger end of the inner ring or raceway, wherein such rollers are held, is fixedly mounted a member 5 somewhat resembling a pulley in that it is peripherally grooved, although the flange 6 on the one side, *i. e.* that contiguous to said ring, is lower than the flange 7 on the other side. In fact the diameter of the member on the first mentioned side is approximately the same as that of the ring 2 at its adjacent end. Passing loosely around this pulley-like member is a sprocket chain 8 or equivalent closed member, the lower end of which depends in a body of lubricant contained in a suitable chamber or well 9. Pet-cocks 10 in the side wall of the latter enable the oil to be drawn off to various levels, or entirely drained as desired, while an opening 11 in the upper portion of the chamber is provided for supplying the oil or other lubricant thereto.

The modified construction illustrated in Fig. 2 has the same arrangement of pulley-like member 5, and chain 8 suspended therefrom for elevating the lubricant; however, since the bearing consists of balls 12 instead of rollers, the inner and outer raceways 13 and 14 are of corresponding form. The journal box 15 in which the outer raceway is held, is furthermore provided with a drain passage 16 by which any excess of oil that may find its way beyond the bearing is returned to the chamber 9.

Figure 3:
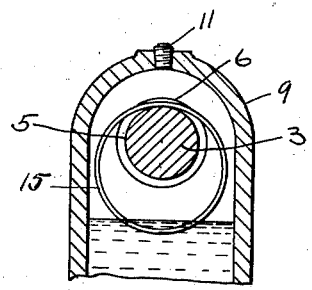

The construction shown in Fig. 3 is closely similar to that of Figs. 1 and 2, except in the nature of the ring which is used, and which, in this case, is not a chain as in Figs. 1 and 2, but merely a closed, smooth, round ring. A smooth ring will act in substantially the same manner as the chain already described, and in some constructions is to be preferred to the chain, as it will not swing laterally and strike against the side of the case, in the event that the device is applied to a bearing on the shaft, which has lateral or longitudinal motion.

The operation of the device is substantially the same in both constructions thus illustrated. The oil elevated by the chain 8 is thrown or caused to flow over the lower wall 6 of the pulley member 5 into the space between the two rings or raceways, at the uppermost point thereof. In the case of the roller bearing the conical form of the outer ring provides a natural incline for the return flow of the lubricant, while in the construction illustrated in Fig. 2 the passage 16 serves the same purpose. In either case the lubricant will flow around the rings or raceways, so that the rollers or pulleys at all times practically float in a bath of oil. The chain of course, does not depend at the bottom of the chamber, so that the lubricant is elevated only from the upper stratum, which is relatively free from any grit or dirt that may be present or collect in the course of operation in the lubricant.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination with a bearing comprising inner and outer rings and antifriction members held therebetween; of a well for lubricant; a peripherally grooved member mounted adjacent said inner ring; and a pendent closed member passing loosely around said grooved member adapted to elevate the lubricant, said grooved member being formed to cause such lubricant to flow between said rings, substantially as described.

2. In mechanism of the character described, the combination with a bearing comprising inner and outer rings and antifriction members held therebetween; of a well for lubricant; a peripherally grooved member mounted adjacent said inner ring, the flange on the side of said member contiguous to said inner ring being lower than the other flange and of approximately the same diameter as said ring; and a pendent closed flexible member passing loosely around said grooved member adapted to elevate the lubricant to the latter whence it flows between said rings.

3. In mechanism of the character described, the combination with a bearing comprising inner and outer rings and antifriction members held therebetween; of a well for lubricant; a peripherally grooved member mounted adjacent said inner ring, the flange on the side of said member contiguous to said inner ring being lower than the other flange and of approximately the same diameter as said ring; a pendent closed flexible member passing loosely around said grooved member adapted to elevate the lubricant to the latter whence it flows between said rings; and means for returning excess lubricant from said bearing to said well.

Signed by me this 20th day of November, 1918.

CHARLIE L. HAWES.